US010399420B2

(12) United States Patent
Rossi (10) Patent No.: US 10,399,420 B2
(45) Date of Patent: Sep. 3, 2019

(54) TONNEAU SYSTEM FOR USE WITH A PICKUP TRUCK

(71) Applicant: TRUXMART LTD., Vaughan (CA)

(72) Inventor: Steven Rossi, Vaughan (CA)

(73) Assignee: WORKSPORT LTD., Vaughan (CA)

( * ) Notice: Subject to any disclaimer, the term of this patent is extended or adjusted under 35 U.S.C. 154(b) by 0 days.

(21) Appl. No.: 15/524,169

(22) PCT Filed: Nov. 4, 2015

(86) PCT No.: PCT/CA2015/051137
§ 371 (c)(1),
(2) Date: May 3, 2017

(87) PCT Pub. No.: WO2016/070276
PCT Pub. Date: May 12, 2016

(65) Prior Publication Data
US 2017/0355251 A1    Dec. 14, 2017

Related U.S. Application Data

(60) Provisional application No. 62/074,954, filed on Nov. 4, 2014.

(51) Int. Cl.
*B60J 7/14*        (2006.01)
*B60J 7/19*        (2006.01)

(52) U.S. Cl.
CPC ............... *B60J 7/141* (2013.01); *B60J 7/198* (2013.01)

(58) Field of Classification Search
CPC ................................. B60J 7/141; B60J 7/14
See application file for complete search history.

(56) References Cited

U.S. PATENT DOCUMENTS 5,011,214 A * 4/1991 Friesen .................... B60J 7/141
                                                160/213
6,564,141 B2   5/2003 Steffens et al.
(Continued)

OTHER PUBLICATIONS

International Search Report corresponding to PCT/CA2015/051137 Canadian Intellectual Property Office; dated Mar. 2, 2016.
(Continued)

*Primary Examiner* — Hilary L Gutman
(74) *Attorney, Agent, or Firm* — Eric J. Sosenko; Jonathan P. O'Brien; Honigman LLP (57) ABSTRACT

A tonneau system for use with a pickup truck is provided. The tonneau system includes a tonneau cover, a first bracket, and a second bracket. The tonneau cover includes a front cross-member, a primary tonneau section hingedly coupled to the front cross-member, and at least one secondary tonneau section hingedly coupled in series to the first tonneau section. The first bracket extends from the front cross-member proximal to a first end thereof for securing the first end of the front cross-member to a first side wall of a cargo box of a pickup truck when the front cross-member is positioned atop a bulkhead of the cargo box. The second bracket extends from the front cross-member proximal to a second end thereof opposite the first end for securing the second end of the front cross-member to a second side wall of the cargo box of the pickup truck when the front cross-member is positioned atop the bulkhead of the cargo box.

10 Claims, 7 Drawing Sheets

(56) References Cited

U.S. PATENT DOCUMENTS

| | | | |
|---|---|---|---|
| 7,258,387 B2 | 8/2007 | Weldy | |
| 7,384,089 B1* | 6/2008 | Ablang | B60J 7/141 296/100.08 |
| 7,530,621 B1* | 5/2009 | Curts | B60J 7/141 296/100.1 |
| 8,632,114 B2 | 1/2014 | Yue | |
| 8,690,224 B2 | 4/2014 | Maimin et al. | |
| 8,960,765 B2 | 2/2015 | Facchinello et al. | |
| 9,650,085 B2* | 5/2017 | Wilson | B62D 33/0207 |
| 2004/0160083 A1* | 8/2004 | Marx | B60J 7/041 296/100.09 |
| 2005/0012357 A1* | 1/2005 | Miller | B60J 7/04 296/107.17 |
| 2006/0267370 A1* | 11/2006 | Wheatley | B60J 7/104 296/100.15 |
| 2010/0140973 A1* | 6/2010 | Duncan | B60J 7/141 296/100.09 |
| 2012/0085800 A1* | 4/2012 | Maimin | B60J 7/141 224/404 |
| 2015/0054300 A1* | 2/2015 | Shi | B60J 7/141 296/100.09 |
| 2015/0061315 A1 | 3/2015 | Facchinello et al. | |
| 2016/0114666 A1* | 4/2016 | Xu | B60J 7/141 296/100.07 |
| 2016/0340949 A1* | 11/2016 | Xu | E05D 5/14 |
| 2017/0120736 A1* | 5/2017 | Lutzka | B60J 7/185 |
| 2017/0217294 A1* | 8/2017 | Lutzka | B60J 7/141 |
| 2017/0240033 A1* | 8/2017 | Dylewski, II | B60J 7/198 |
| 2017/0259655 A1* | 9/2017 | Dylewski, II | B60J 7/141 |
| 2017/0291478 A1* | 10/2017 | Hall | B60J 7/198 |
| 2018/0086277 A1* | 3/2018 | Wilson | B60R 9/065 |

OTHER PUBLICATIONS

Written Opinion of the International Searching Authority corresponding to PCT/CA2015/051137; Canadian Intellectual Property Office; dated Mar. 2, 2016.

* cited by examiner

TONNEAU SYSTEM FOR USE WITH A PICKUP TRUCK

TECHNICAL FIELD

The following relates generally to tonneaus. In particular, the following relates to a tonneau system for use with a pickup truck.

SUMMARY

In one aspect, a tonneau system for use with a pickup truck is provided, comprising: a tonneau cover, comprising: a front cross-member; a primary tonneau section hingedly coupled to the front cross-member; and at least one secondary tonneau section hingedly coupled in series to the first tonneau section; a first bracket extending from the front cross-member proximal to a first end thereof for securing the first end of the front cross-member to a first side wall of a cargo box of a pickup truck when the front cross-member is positioned atop a bulkhead of the cargo box; and a second bracket extending from the front cross-member proximal to a second end thereof opposite the first end for securing the second end of the front cross-member to a second side wall of the cargo box of the pickup truck when the front cross-member is positioned atop the bulkhead of the cargo box.

The front cross-member of the tonneau cover can be only secured to the pickup truck via the first bracket and the second bracket.

The front cross-member of the tonneau cover can be unsecured to the bulkhead of the cargo box.

The front cross-member of the tonneau cover can be clear of the main opening of the cargo box when the front cross-member is secured to the pickup truck via the first bracket and the second bracket.

The tonneau system can further comprise: a first side rail being securable to the first side wall of the pickup truck, the first bracket being securable to the first side rail; and a second side rail being securable to the second side wall of the pickup truck, the second bracket being securable to the second side rail.

The front cross-member can comprise: at least one channel for receiving and securely retaining an end portion of the brackets.

The front cross-member can further comprise: a lip partially enclosing the channel.

The front cross-member can comprise: a gap in the lip to permit engagement of the bracket with the channel.

These and other aspects are contemplated and described herein. It will be appreciated that the foregoing summary sets out representative aspects of a tonneau system for use with a pickup truck to assist skilled readers in understanding the following detailed description.

BRIEF DESCRIPTION OF THE DRAWINGS

A greater understanding of the embodiments will be had with reference to the Figures, in which:

FIG. 3b is a detailed side perspective view of the bracket being inserted into the channel of the front cross-member of FIG. 3a;

FIG. 3c is a detailed side perspective view of the bracket having been inserted into the channel of the front cross-member of FIG. 3a;

FIG. 3d is a detailed side perspective view of the bracket having been moved partially along the channel of the front cross-member of FIG. 3a;

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The following provides a tonneau system for use with a pickup truck. The described tonneau system includes a tonneau cover having a front cross-member, a primary tonneau section hingedly coupled to the front cross-member, and at least one secondary tonneau section hingedly coupled in series to the first tonneau section, a first bracket securable to the front cross-member proximal to a first end thereof for securing the first end of the front cross-member to a first side wall of a cargo box of a pickup truck when the front cross-member is positioned atop a bulkhead of the cargo box, and a second bracket securable to the front cross-member proximal to a second end thereof opposite the first end for securing the second end of the front cross-member to a second side wall of the cargo box of the pickup truck when the front cross-member is positioned atop the bulkhead of the cargo box.

By securing the front cross-member of the tonneau cover to the side walls of the cargo box, the front cross member of the tonneau cover can be placed atop of the bulkhead, instead of inside the cargo box at the front thereof. This reduces damage done to the pickup truck and the tonneau cover when cargo inside the cargo box of the pickup truck shifts forward, such as, for example, during heavy braking. By not placing the front cross-member inside the cargo box and, instead, atop of the bulkhead, the shifting cargo collides with the front of the cargo box, which is generally better suited to withstand such impacts. Further, as the front cross-member of the tonneau cover is clear of a main opening of the cargo box, it does not impede access to the contents of the cargo box. Still further, installation is simplified as the tonneau cover does not need to be secured to the bulkhead of the cargo box in its position on top of it.

Figure 1:
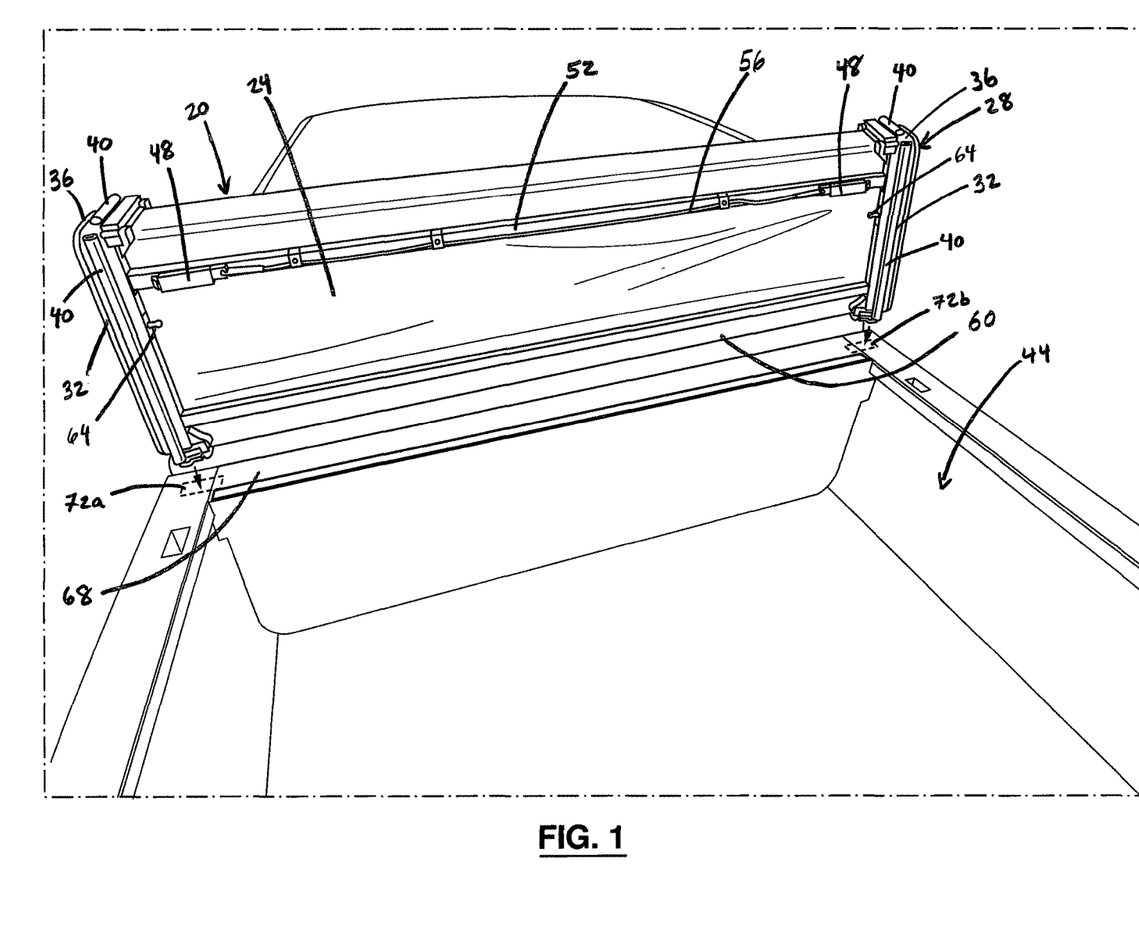
FIG. 1 is a partial rear perspective view of a tonneau cover being positioned atop of a bulkhead of a cargo box of a pickup truck in accordance with one embodiment thereof.

A tonneau cover 20 of a tonneau system for use with a pickup truck is shown in FIG. 1. The tonneau cover 20 includes a cover membrane 24 that spans a frame 28. Cover membrane 24 can be made of a rigid or flexible material, such as plastic, aluminum, vinyl, etc. Frame 28 includes tonneau section frame members 32 and hinge spacers 36 that are hingedly connected to permit sections of tonneau cover 20 defined by tonneau section frame members 32 to nestedly stack, as shown. Hinge spacers 36 space the stacked tonneau sections to permit nesting of other tonneau sections therebetween. Tonneau cover 28 can have a plurality of sections, but in the illustrated example, has four tonneau sections.

Rubber weather stripping 40 is placed on an underside of tonneau section frame members 32 and hinge spacers 36 so that it forms a continuous weather-resistant seal around a bottom periphery of tonneau cover 20 when deployed over a cargo box 44 of the pickup truck. A pair of slam latchbolts 48 are shown positioned along a medial cross-member 52 proximal to a corresponding pair of tonneau section frame members 32 that medial cross-member 52 spans. Slam latchbolts 48 can be opened via a latch cable 56 coupled to both of slam latchbolts 48. A rear-most section of tonneau cover 20 includes another pair of slam latchbolts and a latch cable for locking tonneau cover 20 over cargo box 44.

Tonneau cover 28 can be unfurled from the nested stacked state shown in FIG. 1 to an expanded state, in which it is deployed over and covers cargo box 44. In the expanded state, slam latchbolts 48 and those of the rear-most section of tonneau cover 20 engage catches to lock tonneau cover 20 atop of cargo box 44. Release of slam latchbolts 48 via pulling on latch cables 56 enables nested stacking of tonneau cover 20.

The two forward-most tonneau section frame members 32 defining a first tonneau section are hingedly coupled to a front cross-member 60 (hidden behind a fold of cover membrane 24). The remaining three tonneau sections are hingedly coupled to the first tonneau section. Front cross-member 60 also has rubber weather stripping along a bottom surface. Two connection knobs 64 project inwardly from tonneau section frame members 32.

During installation, the nested stacked tonneau cover 20 is oriented vertically as shown so that front cross-member 60 is at a lower end thereof. Tonneau cover 20 is then lowered onto an upper surface of a bulkhead 68 of cargo box 44, with its corners being aligned with a pair of positions 72a, 72b on the upper surface of bulkhead 68.

Figure 2:
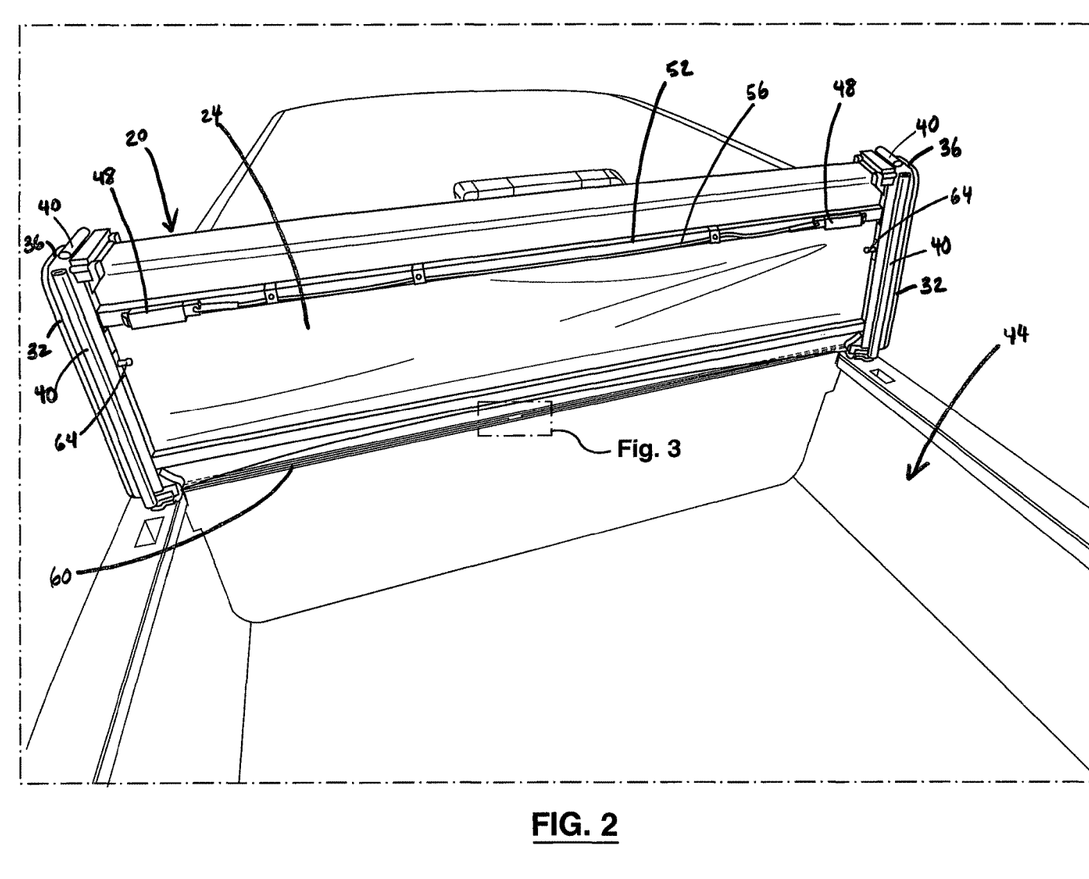
FIG. 2 is a partial rear perspective view of the tonneau cover of FIG. 1 having been placed atop of the bulkhead of the cargo box of the pickup truck.

FIG. 2 shows tonneau cover 20 resting atop of bulkhead 68 after being lowered. A lower fold of cover membrane 24 is lifted, exposing a back side of front cross-member 60.

Figure 3A:
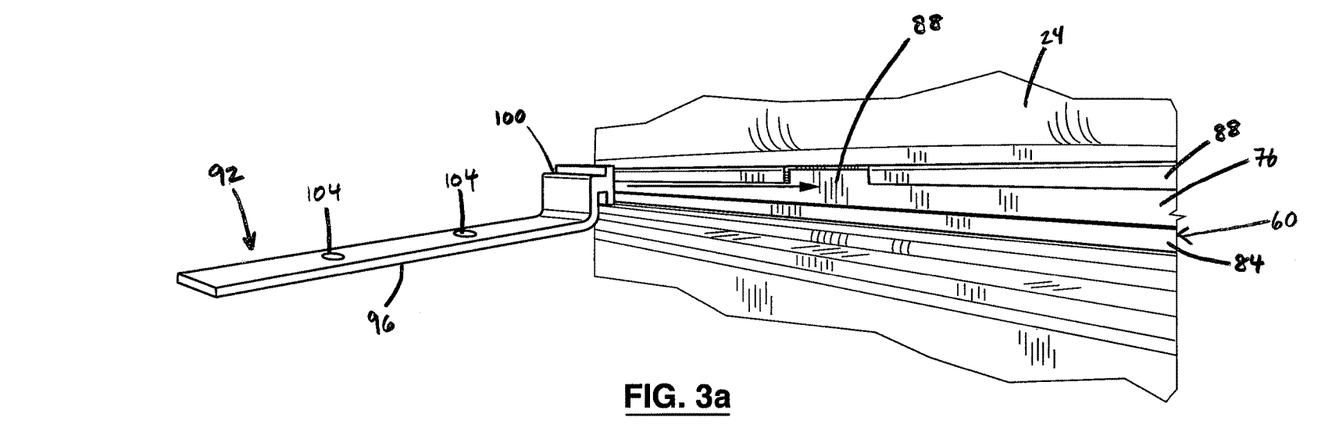
FIG. 3a is a detailed side perspective view of a bracket being aligned for insertion into a channel of a front cross-member of the tonneau cover of FIG. 2.

FIG. 3a shows a central portion of a back side of front cross-member 60 in greater detail. As shown, front cross-member 60 has a channel 76 running lengthwise along its back side. Channel 76 has a lower lip 80 and an upper lip 84 that partially enclose channel 76. A gap 88 is centrally located in upper lip 84.

A bracket 92 is shown being aligned with gap 88. Bracket 92 has a flat portion 96 and an end portion 100 at one end of flat portion 96. End portion 100 has a horizontal T-shaped cross-section corresponding generally to the cross-section of channel 76. A pair of holes 104 is provided along flat portion 96.

Figure 3B:
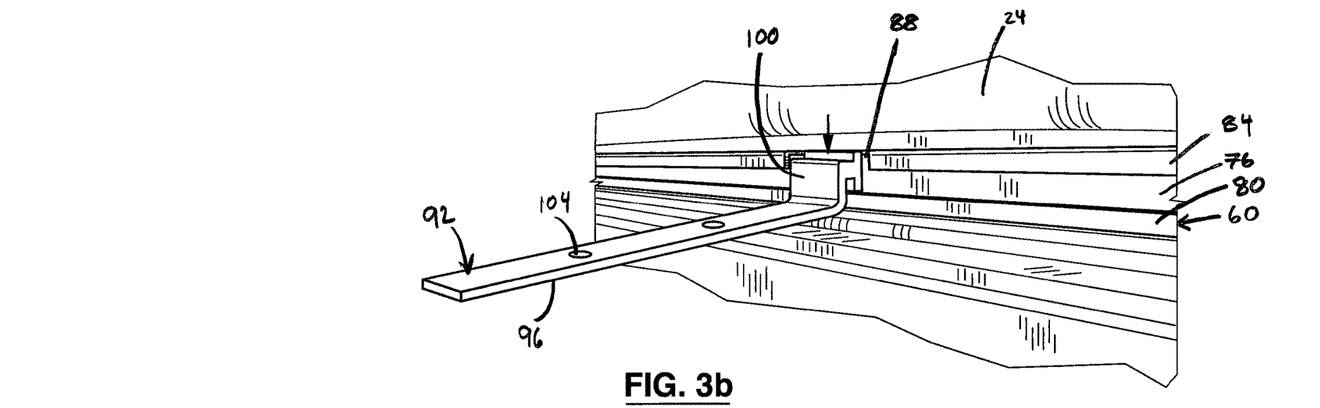

FIG. 3b shows end portion 100 of bracket 92 being inserted into channel 76 via gap 88. The bottom portion of the T-shaped cross-section of end portion 100 is raised over and past lower lip 80. The top portion of the T-shaped cross-section of end portion 100 is aligned with gap 88 in upper lip 84 as the bottom portion of the T-shaped cross-section of end portion 100 is placed behind lower lip 80 in channel 76.

Figure 3C:
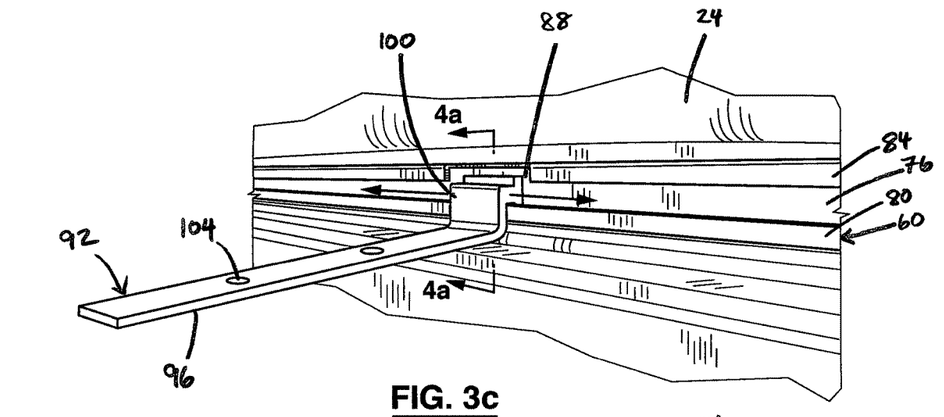

FIG. 3c shows end portion 100 of bracket 92 inserted fully into channel 76. Once end portion 100 of bracket 92 is placed in channel 76, it is slid along channel 76 left or right towards an end of front cross-member 60. As end portion 100 is slid laterally, the top portion of the T-shaped cross-section of end portion 100 engages upper lip 84 to prohibit perpendicular exit of end portion 100 from channel 76.

Figure 3D:
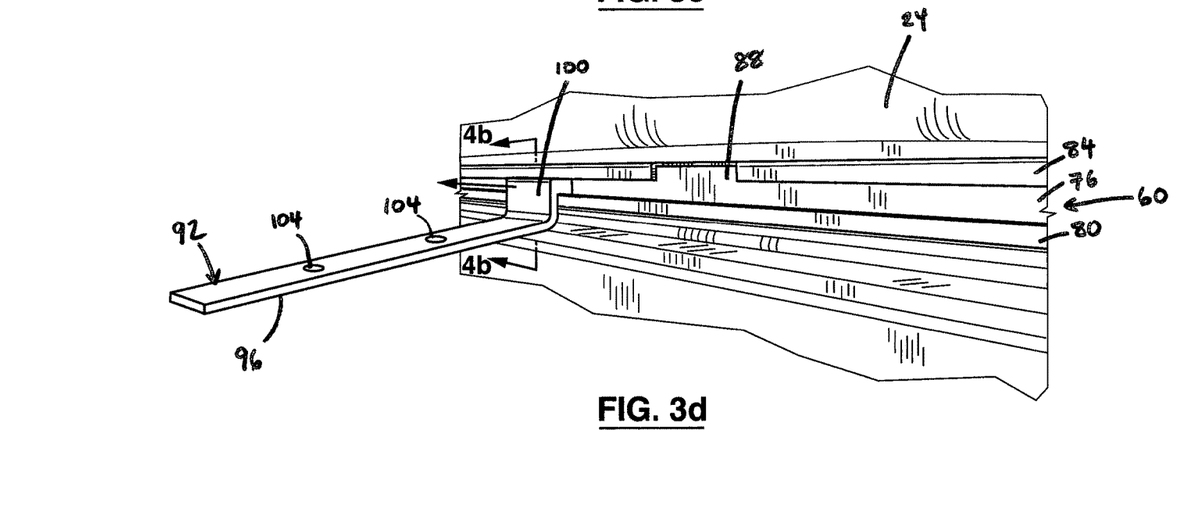

FIG. 3d shows bracket 92 having been slid to the left of gap 88 wherein end portion 100 engages lower lip 80 and upper lip 84 of channel 76. As shown, bracket 92 extends backwardly from front cross-member 60.

Upon insertion and sliding of one bracket 92 to a side of gap 88 towards a first end of front cross-member 60, a second bracket 92 is inserted into channel 76 in the same manner and slid to the other side of gap 88 towards a second end of front cross-member 60 opposite the first end.

Figure 4A:
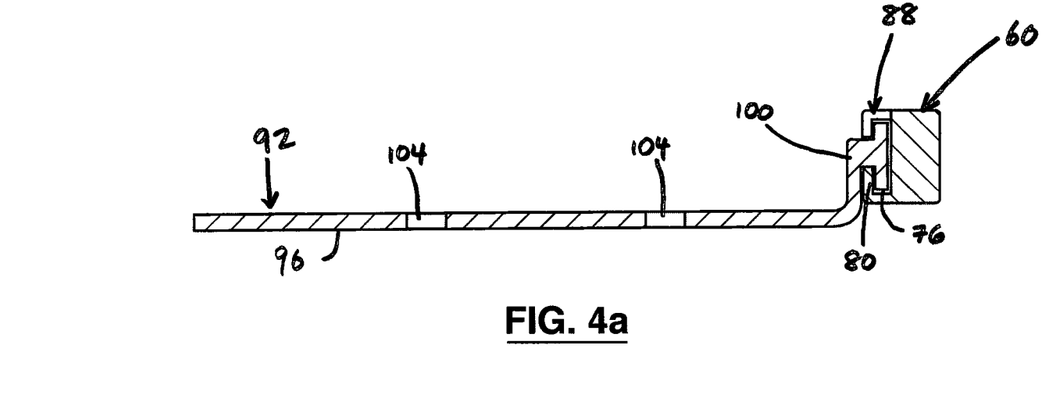
FIG. 4a shows a section view of the bracket inserted into the channel of the front cross-member of FIG. 3c.

FIG. 4a shows a sectional view along line 4a-4a in FIG. 3c. As shown, end portion 100 is inserted into channel 76, with the bottom portion of the T-shaped cross-section of end portion 100 being engaged by lower lip 80, and the top portion of the T-shaped cross-section of end portion 100 being in gap 88.

Figure 4B:
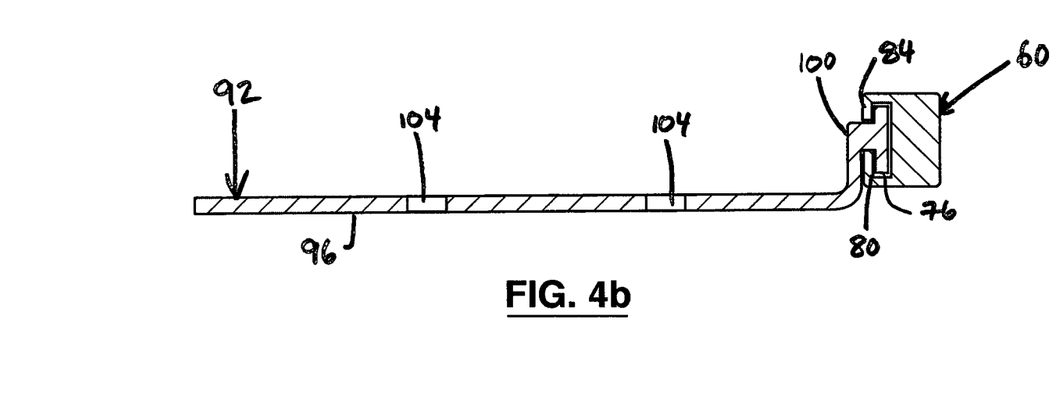
FIG. 4b shows a section view of the bracket having been moved partially along the channel of the front cross-member of FIG. 3d.

FIG. 4b shows a sectional view along line 4b-4b in FIG. 3d. As shown, end portion 100 is inserted into channel 76, with the bottom portion of the T-shaped cross-section of end portion 100 being engaged by lower lip 80, and the top portion of the T-shaped cross-section of end portion 100 being engaged by upper lip 84, thereby securing bracket 92 from perpendicular exit from channel 76.

Figure 5A:
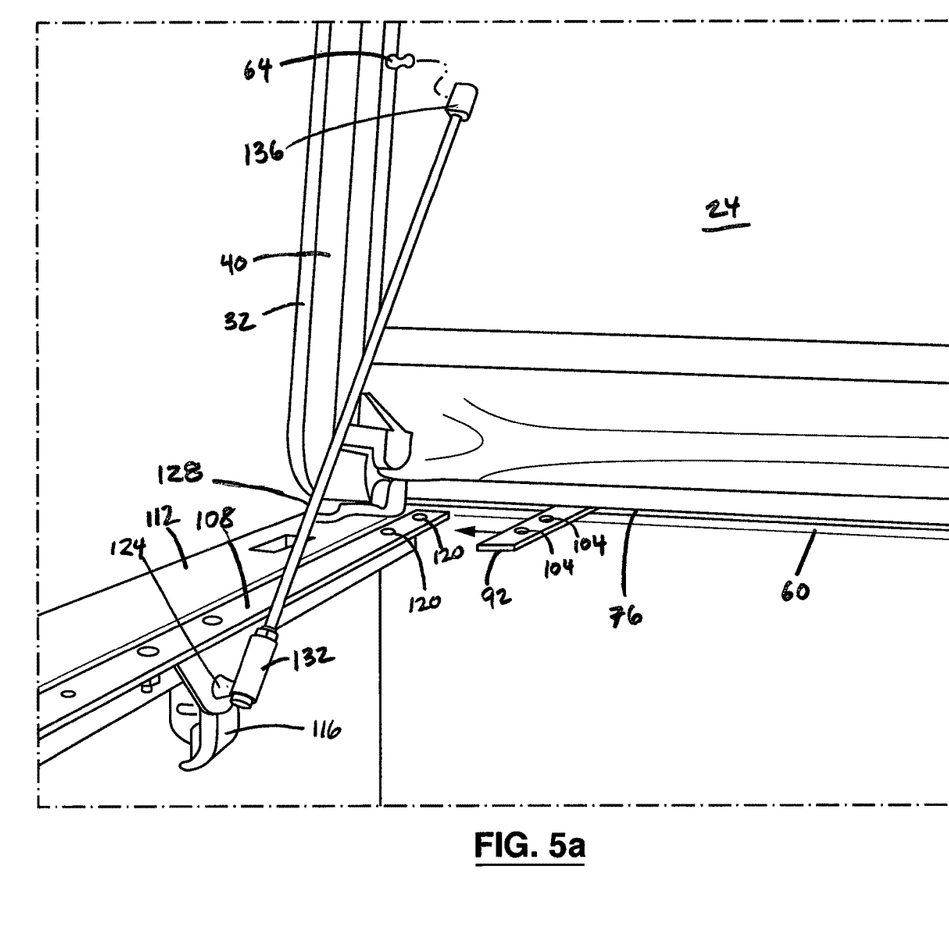
FIG. 5a shows a partial rear perspective view of the tonneau cover atop of the bulkhead of the cargo box of the pickup truck wherein the bracket is being aligned along the channel of the front cross-member with a side rail, and a prop rod connected to the side rail is being aligned with a connection knob of the tonneau cover.

FIG. 5a shows bracket 92 having been inserted into channel 76 of front cross-member 60 and slid towards a longitudinal end of front cross-member 60. A side rail 108 is shown secured to a side wall 112 of cargo box 44 via a clamp 116. A second side rail 108 is secured to an opposite side wall 112 of cargo box 44. Side rails 108 generally have an inverted L-shaped cross-section providing a top wall and a side wall. The side wall of each side rail 108 is clamped to one of the side walls 112 of the cargo box 44 of the pickup truck such that the top surface of the top wall is generally flush with the top of the side wall 112 of the cargo box 44. A pair of holes 120 passes through the top wall of each side rail 108 near a front longitudinal end. Side rails 108 include catches for engaging slam latchbolts 48 when tonneau cover 20 is in an expanded state atop of cargo box 44.

A connection knob 124 of each side rail 108 projects into cargo box 44 below the top surface of the side rail 108. A prop rod 128 is snap fit onto each connection knob 124 at a lower end 132 to form a ball-and-socket joint, and is aligned at an upper end 136 with corresponding connection knob 64 of tonneau cover 20 when it is desired to support tonneau cover 20 in an upright position, as shown.

Each bracket 92 is slid along towards one of side rails 108 to align holes 104 with holes 120 of side rail 108. The securing of brackets 92 in the channel 76 permits their positioning to be adjusted to employ the tonneau system with pickup trucks having a variety of cargo box widths.

Figure 5B:
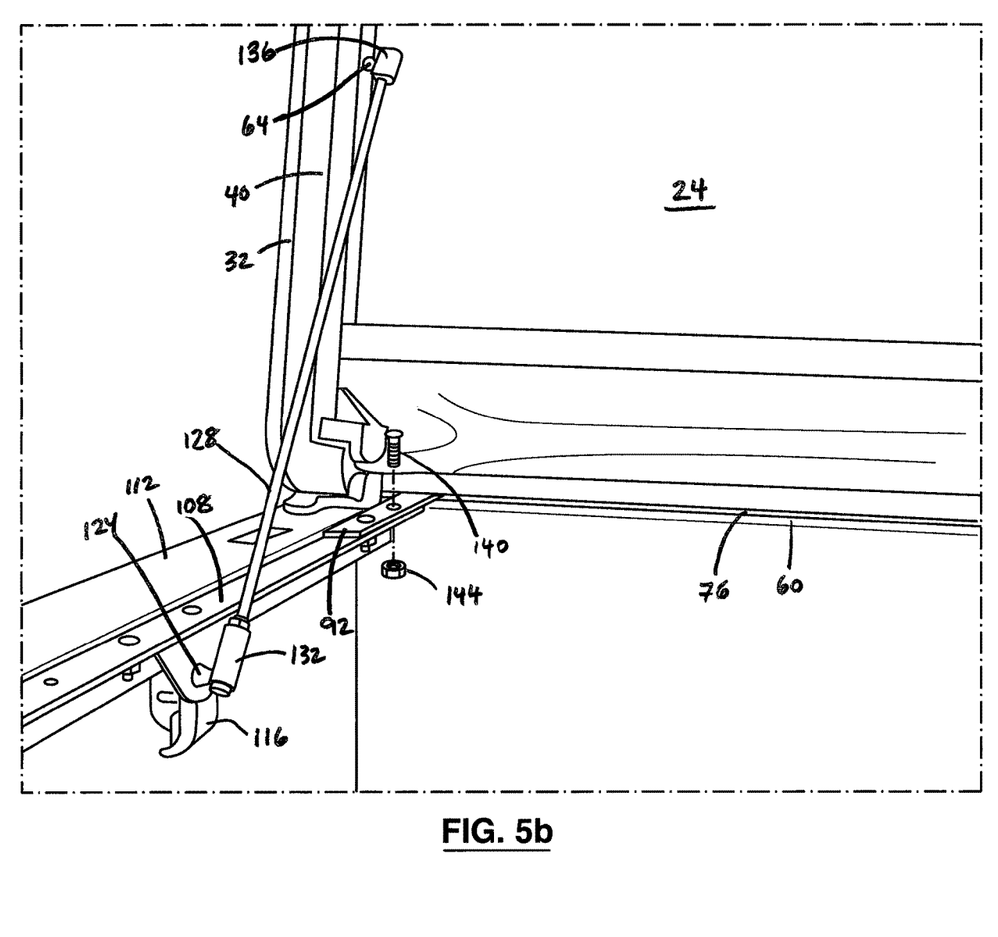
FIG. 5b shows a partial rear perspective view of the tonneau cover atop of the bulkhead of the cargo box of the pickup truck wherein the bracket is being secured to the side rail and the prop rod is connected to the connection knob of the tonneau cover.

FIG. 5b shows one of brackets 92 having been slid along channel 76 to align holes 104 with holes 120 of side rail 108. In this position, bolts 140 are inserted through holes 104 and 120, and are secured via nuts 144. In this way, brackets 92 secure tonneau cover 20 to side rails 108 that are secured to side walls 112 of the cargo box 44, thus securing tonneau cover 20 to side walls 112 of cargo box 44.

Upper ends 136 of prop rods 128 are snap fit atop of connection knobs 64 of tonneau cover 20 as shown to support tonneau cover 20 in an upright position, as shown. They then can be unsnapped and lowered into cargo box 44 when it is desired to deploy tonneau cover 20 across the top of cargo box 44 and over the main opening of cargo box 44 to protect the contents of cargo box 44 from the elements, theft, and accidental loss during operation of the pickup truck.

By securing front cross-member 60 of tonneau cover 20 atop of bulkhead 68 of cargo box 44 such that front cross-member 60 is clear of the main opening of cargo box 44, the extraction of the contents of cargo box 44 is not impeded by tonneau cover 20 at the front of cargo box 44. Further, cargo in the cargo box 44 that shifts forward during deceleration of the pickup truck collides with the front of cargo box 44 and not with a cross-member 60, thus preventing damage to tonneau cover 20 and the pickup truck.

Further, by securing front cross-member 60 of tonneau cover 20 to the side walls of cargo box 44, its installation can be facilitated.

While, in the above-described embodiments, the brackets are described as separate elements that are secured to the front cross-member by inserting them in a channel of the front cross-member, those skilled in the art will appreciate that the brackets can be secured to the front cross-member in other ways. For example, they may be secured to the front cross-member via fasteners. Further, the brackets can be made integrally with the front cross-member.

Still further, the brackets may be secured directly to the side walls of the pickup truck. For example, the brackets can include clamps or clampable elements that can be clamped to the side walls of the cargo box of a pickup truck. In another alternative embodiment, the brackets can be fastened via fasteners such as bolts or the like to the side walls of the cargo box.

The front cross-member can have more than one channel for receiving brackets. Further various configurations of connectors for connecting the brackets to the front cross-member can be used.

Instead of employing a peripheral frame, the tonneau cover can be made of rigid panels and spacer members hingedly coupled along their joints.

Although the invention has been described with reference to certain specific embodiments, various modifications thereof will be apparent to those skilled in the art. The scope of the claims should not be limited by the preferred embodiments, but should be given the broadest interpretation consistent with the description as a whole.

The invention claimed is:

1. A tonneau system for use in covering a cargo box of a pickup truck, comprising:
   a tonneau cover, comprising:
      a front cross-member;
      a primary tonneau section hingedly coupled at a first end of the primary tonneau section to the front cross-member; and
      at least one secondary tonneau section hingedly coupled in series to the primary tonneau section at a second end of the primary tonneau section;
   a first bracket extending lengthwise laterally from the front cross-member proximal to a first end thereof for securing the first end of the front cross-member to a first side wall of the cargo box of the pickup truck when the front cross-member is positioned atop a bulkhead of the cargo box; and
   a second bracket extending lengthwise laterally from the front cross-member proximal to a second end thereof opposite the first end for securing the second end of the front cross-member to a second side wall of the cargo box of the pickup truck when the front cross-member is positioned atop the bulkhead of the cargo box.

2. The tonneau system of claim 1, wherein the front cross-member of the tonneau cover is solely secured to the pickup truck via the first bracket and the second bracket.

3. The tonneau system of claim 1, wherein the front cross-member of the tonneau cover is unsecured to the bulkhead of the cargo box.

4. The tonneau system of claim 1, wherein the second end of the primary tonneau section is different from the first end of the primary tonneau section.

5. The tonneau system of claim 1, wherein the second end of the primary tonneau section is opposed to the first end of the primary tonneau section.

6. A tonneau system for use in covering a main opening of a cargo box of a pickup truck, comprising:
   a tonneau cover, comprising:
      a front cross-member;
      a primary tonneau section hingedly coupled to the front cross-member; and
      at least one secondary tonneau section hingedly coupled in series to the primary tonneau section;
   a first bracket extending from the front cross-member proximal to a first end thereof for securing the first end of the front cross-member to a first side wall of the cargo box of the pickup truck when the front cross-member is positioned atop a bulkhead of the cargo box;
   a second bracket extending from the front cross-member proximal to a second end thereof opposite the first end for securing the second end of the front cross-member to a second side wall of the cargo box of the pickup truck when the front cross-member is positioned atop the bulkhead of the cargo box; and
   the front cross-member having a length not extending over and being clear of the sidewalls of the cargo box when the front cross-member is secured to the pickup truck via the first bracket and the second bracket.

7. The tonneau system of claim 1, further comprising:
   a first side rail, the first bracket being mounted to the first side rail; and
   a second side rail, the second bracket being mounted to the second side rail;

wherein the first and second side rails are configured to be respectively secured to the first and second side walls of the pickup truck.

8. The tonneau system of claim 1, wherein the front cross-member comprises: at least one channel for receiving and securely retaining an end portion of the brackets.

9. The tonneau system of claim 8, wherein the front cross-member further comprises: a lip partially enclosing the channel.

10. The tonneau system of claim 9, wherein the front cross-member comprises: a gap in the lip to permit engagement of the bracket with the channel.

\* \* \* \* \*